(12) United States Patent
Gassner

(10) Patent No.: US 9,397,512 B2
(45) Date of Patent: Jul. 19, 2016

(54) CHARGING DEVICE FOR WIRELESS HAND CONTROLLER AND THE CHARGING SYSTEM THEREOF

(71) Applicant: LIMOSS (SHENZHEN) CO., LTD, Shenzhen, Guangdong (CN)

(72) Inventor: Christian Gassner, Shenzhen (CN)

(73) Assignee: LIMOSS (SHENZHEN) CO., LTD, Shenzhen (CN)

( * ) Notice: Subject to any disclaimer, the term of this patent is extended or adjusted under 35 U.S.C. 154(b) by 183 days.

(21) Appl. No.: 14/322,969

(22) Filed: Jul. 3, 2014

(65) Prior Publication Data

US 2015/0311732 A1    Oct. 29, 2015

(30) Foreign Application Priority Data

Apr. 23, 2014    (CN) .................. 2014 2 0200063 U

(51) Int. Cl.
| | |
|---|---|
| *H02J 7/00* | (2006.01) |
| *H02J 5/00* | (2016.01) |
| *H02J 7/02* | (2016.01) |
| *H02J 17/00* | (2006.01) |

(52) U.S. Cl.
CPC .............. *H02J 7/0044* (2013.01); *H02J 5/005* (2013.01); *H02J 7/025* (2013.01); *H02J 17/00* (2013.01)

(58) Field of Classification Search
CPC ...................................................... H02J 7/0044

USPC ........................................ 320/107, 113, 115
See application file for complete search history.

(56) References Cited

U.S. PATENT DOCUMENTS

| | | | | | |
|---|---|---|---|---|---|
| 4,031,827 | A | * | 6/1977 | Collier | .................. F42C 15/295 102/208 |
| 5,752,135 | A | * | 5/1998 | Coffey | ............... G03G 15/0216 399/115 |
| 6,516,227 | B1 | * | 2/2003 | Meadows | .............. A61N 1/0553 607/117 |
| D736,721 | S | * | 8/2015 | Gassner | ........................ D13/168 |
| D744,434 | S | * | 12/2015 | Gassner | ........................ D13/168 |
| 2011/0135968 | A1 | * | 6/2011 | Kim | ..................... H01M 2/0215 429/7 |

* cited by examiner

*Primary Examiner* — M'Baye Diao

(57) ABSTRACT

The present invention provides a charging device for wireless hand controller and the charging system thereof, which comprises a charging device body, wherein, on the charging device body is provided with a charging chamber used to locate a device to be charged, on the bottom of the charging chamber is provided with at least two probes used to connect to electrodes of the device to be charged and at least one pop-up structure used to pop-up and eject the device to be charged when taking it out, and on each of two opposing side walls of the charging chamber is provided with at least one snap structure used to lock and fix the device to be charged. The arrangements of the pop-up structures and the snap structure make the placement or removal of the hand controller easier and more convenient.

14 Claims, 4 Drawing Sheets

CHARGING DEVICE FOR WIRELESS HAND CONTROLLER AND THE CHARGING SYSTEM THEREOF

CROSS-REFERENCES TO RELATED APPLICATIONS

This application claims the priority of Chinese patent application No. 201420200063.7, filed on Apr. 23, 2014, the entire contents of all of which are incorporated herein by reference.

FIELD OF THE INVENTION

The present invention relates to the field of charging devices, and more particularly, to a charging device for wireless hand controller and the charging system thereof.

BACKGROUND

Currently, most of the commonly used hand controllers are operated with mechanical push-button switches, which have relatively shorter service lives and relatively simple functions, therefore, they still belong to the relatively low grade products, and hardly satisfy the higher and higher requirements from users on product properties such as interactivities, diversities and visualizations. However, following the rapid development and gradual maturation of touch-display technologies, hand controllers with touch screens have also been emerging out.

When the battery power of a touch screen hand controller is used up, it is required to recharge the battery. However, currently in the market, those charging devices work for hand controllers are not convenient to use at all, during the process of either placing the hand controllers in for charge or taking them out when the batteries are full.

Therefore, the prior art needs to be improved and developed.

SUMMARY

The technical problems to be solved in the present invention is, aiming at the defects of the prior art, providing a charging device for wireless hand controller and the charging system thereof, in order to place or remove the wireless hand controller during the charging processes more conveniently.

The technical solution of the present invention to solve the said technical problems is as follows:

A charging device for wireless hand controller, which comprises a charging device body, wherein, on the said charging device body is provided with a charging chamber used to locate a device to be charged, on the bottom of the said charging chamber is provided with at least two probes and at least one pop-up structure, the said probe is used to connect to an electrode of the device to be charged, the said pop-up structure is used to pop-up and eject the device to be charged when taking it out, and on each of two opposing side walls of the charging chamber is provided with at least one snap structure used to lock and fix the device to be charged.

The said charging device for wireless hand controller, wherein, on the said charging device body is provided with at least four fixing structures, used to fix multi-layer shell of the said charging device body.

The said charging device for wireless hand controller, wherein, the said fixing structure comprises an external thread structure and a nut structure, the said external thread structure is arranged on the said multi-layer shell of the charging device body, and the said nut structure is screwed on the said external thread structure.

The said charging device for wireless hand controller, wherein, on the bottom of the said charging chamber is provided with at least two probes, used to connect to the electrodes of the device to be charged.

The said charging device for wireless hand controller, wherein, the said probe has a compressible resilient structure, which can be compressed following the direction of its length.

The said charging device for wireless hand controller, wherein, on the bottom of the said charging chamber is provided with two pop-up structures, used to pop-up and eject the device to be charged when taking it out.

The said charging device for wireless hand controller, wherein, the said pop-up structure comprises a spring, and a pop-out cap, the said pop-out cap is connected to one end of the said spring, used to drive the said spring, while a position hook is arranged and connected to the said pop-out cap, used to lock the position of the said pop-up structure onto the said charging device body.

A charging system for wireless hand controller, wherein, it comprises a charging device body and a wireless hand controller; On the said charging device body is provided with a charging chamber used to locate a device to be charged, on the bottom of the said charging chamber is provided with at least two probes and at least one pop-up structure, the said probe is used to connect to an electrode of the device to be charged, the said pop-up structure is used to pop-up and eject the device to be charged when taking it out, and on each of two opposing side walls of the charging chamber is provided with at least one snap structure used to lock and fix the device to be charged; On each of two side walls of the said wireless hand controller is provided with a slot used to accommodate the said snap structure, corresponding to the position of the said snap structure in the charging chamber, and the said wireless hand controller is provided with a charging hole used to accommodate the said probe, corresponding to the position of the probe in the said charging chamber.

The said charging system for wireless hand controller, wherein, on the said charging device body is provided with at least four fixing structures, used to fix multi-layer shell of the said charging device body.

The said charging system for wireless hand controller, wherein, the said fixing structure comprises an external thread structure and a nut structure, the said external thread structure is arranged on the said multi-layer shell of the charging device body, and the said nut structure is screwed on the said external thread structure.

The said charging system for wireless hand controller, wherein, on the bottom of the said charging chamber is provided with at least two probes, used to connect to the electrodes of the device to be charged.

The said charging system for wireless hand controller, wherein, the said probe has a compressible resilient structure, which can be compressed following the direction of its length.

The said charging system for wireless hand controller, wherein, on the bottom of the said charging chamber is provided with two pop-up structures, used to pop-up and eject the device to be charged when taking it out.

The said charging system for wireless hand controller, wherein, the said pop-up structure comprises a spring, and a pop-out cap, the said pop-out cap is connected to one end of the said spring, used to drive the said spring, while a position hook is arranged and connected to the said pop-out cap, used to lock the position of the said pop-up structure onto the said charging device body.

BENEFITS OF THE INVENTION

A charging device for wireless hand controller and the charging system thereof, as provided by the present invention, due to pop-up structure arranged in the charging chamber of the charging device body, used to pop-up and eject the device to be charged when taking it out, and snap structure arranged on each of two opposing side walls of the charging chamber, used to fix the device to be charged, have made the placement or removal of the hand controller in the charging device easier and more convenient.

DETAILED DESCRIPTION

In order to make the purpose, technical solution and the advantages of the present invention clearer and more explicit, further detailed descriptions of the present invention is stated here, referencing to the attached drawings and some embodiments of the present invention. It should be understood that the detailed embodiments of the invention described here are used to explain the present invention only, instead of limiting the present invention.

Figure 1:
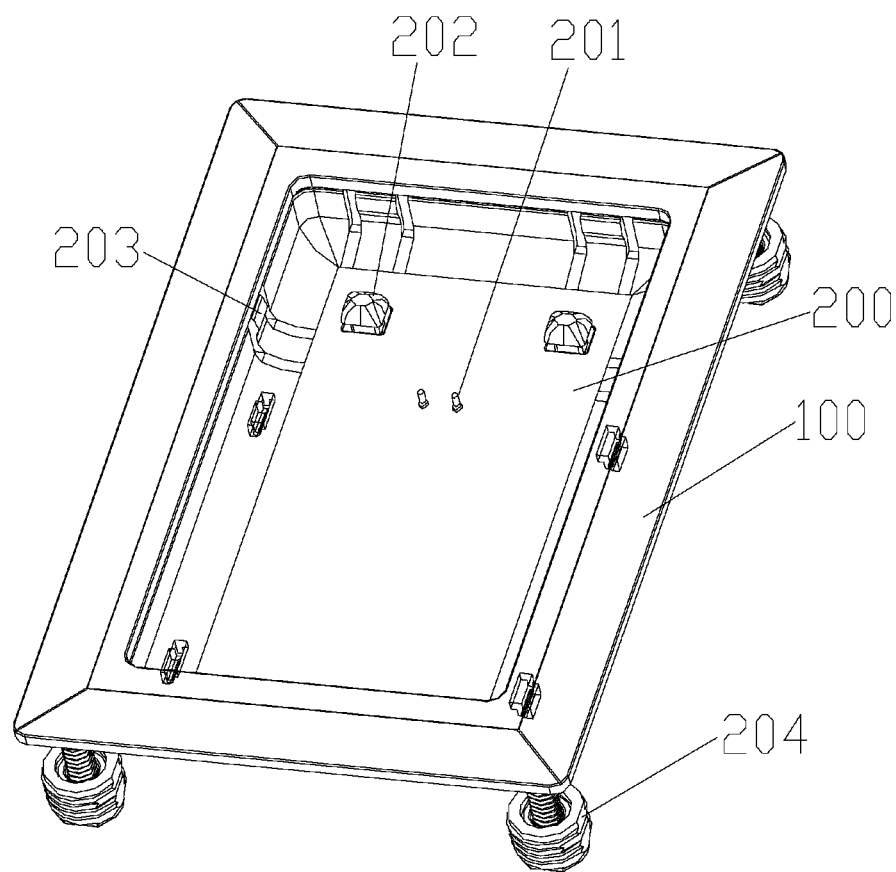
FIG. 1 illustrates a structural schematic diagram of a preferred embodiment on the charging device for wireless hand controller in the present invention.
Figure 2:
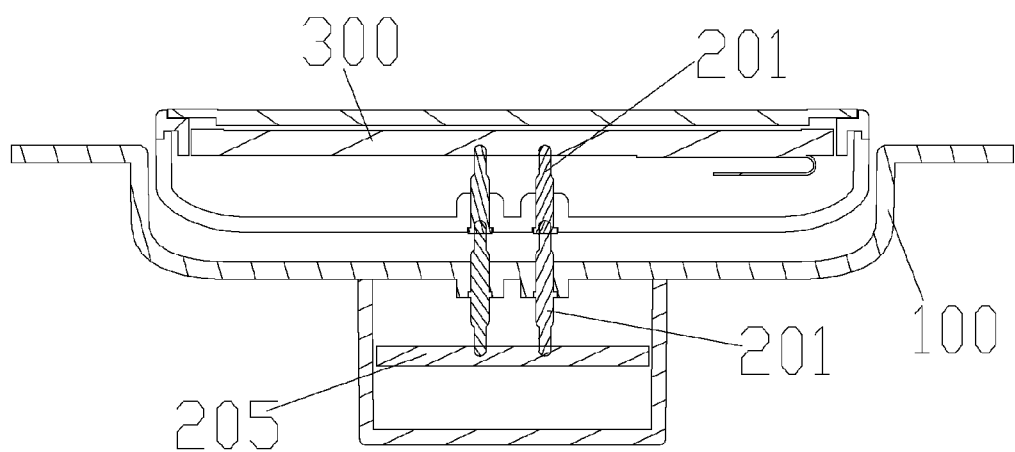
FIG. 2 illustrates a sectional diagram on the operation status when a wireless touch screen hand controller is placed in the said charging device for wireless hand controller as described in the present invention.

Refer to FIG. 1 and FIG. 2, wherein, FIG. 1 illustrates a structural schematic diagram of a preferred embodiment on the charging device for wireless hand controller in the present invention, and FIG. 2 illustrates a sectional diagram on the operation status when a wireless touch screen hand controller is placed in the said charging device for wireless hand controller as described in the present invention. The said charging device for wireless hand controller comprises a charging device body 100, and, a charging chamber 200, used to locate a device to be charged, arranged on the said charging device body 100, on the bottom of the said charging chamber 200 is provided with at least two probes 201 and at least one pop-up structure 202, the said probe 201 is used to connect to an electrode of the device 300 to be charged, the said pop-up structure 202 is used to pop-up and eject the device 300 to be charged when taking it out, and on each of two opposing side walls of the said charging chamber 200 is provided with at least one snap structure 203, used to lock and fix the device 300 to be charged.

In a preferred embodiment of the present invention, on the said charging device body 100 is provided with a charging chamber 200, while the concave shape of the charging chamber 200 matches the shape of the device 300 to be charged well. And on the bottom of the said charging chamber 200 is provided with at least two probes 201 used to connect to the electrodes of the device 300 to be charged, when the said device 300 to be charged is placed into the said charging chamber 200, the said probe 201 will connect to the electrode of the circuit board placed in the said device 300 to be charged. As well as on the bottom of the said charging chamber 200 is provided with at least one pop-up structure 202 used to pop-up and eject the device 300 to be charged when taking it out. When the said device 300 to be charged needs to be taken out, press down the said device 300 to the bottom of the charging chamber, the said pop-up structure 202 will pop up and eject the said device 300 to be charged. And on each of two opposing side walls of the said charging chamber 200 is provided with at least one snap structure 203, used to lock and fix the said device 300 to be charged, while on the according side wall of the said device 300 is provided with a slot used to accommodate the said snap structure 203. When the device 300 needs to be charged, place the said device 300 to be charged into the said charging chamber 200, the said snap structure 203 will engage with the slot in the said device 300, and fix the device 300 firmly into the said charging chamber 200.

Preferably, as shown in FIG. 1, on the said charging device body 100 is provided with at least four fixing structures 204, used to fix multi-layer shell of the said charging device body 100. In the specific embodiment, at each of four right angle corners of the rectangular shaped charging device body 100 is provided with one fixing structure 204, used to clamp and fix the multi-layer shell of the said charging device body 100, to avoid the shedding of any layers off the shell.

Further, the said fixing structure 204 comprises an external thread structure and a nut structure, the said external thread structure is arranged on the said multi-layer shell of the charging device body, and the said nut structure is screwed on the said external thread structure. When screwing the said nut structure on the said external thread structure, the multi-layer shell of the said charging device body 100 will be clamped tightly and fixed, and the separation of the multi-layers could be avoided. When placing the said charging device body 100 on a surface and starting charging, the said nut structure can produce damping effectively, thus improve the structural stability of the charging device greatly, and extend the service life of the charging device effectively.

Preferably, on the bottom of the said charging chamber 200 is provided with at least two probes 201, used to connect to electrodes of a device to be charged. As shown in FIG. 2, part of the said probe 201 is arranged inside the shell of the said charging device body 100, used to connect the circuit board 205 for charging, while the other part exposes outside of the shell of the said charging device body 100 (that is, the height of one end of the said probe is higher than the level of the bottom of the charging chamber 200), the said circuit board 205 is also arranged in the said charging device body 100. In a specific embodiment of the application, on the said device 300 is provided with two charging holes accordingly, and when the device 300 to be charged is placed in the charging chamber 200, the said probe 201 will go through the said charging hole, and connect to the electrode of the circuit board in the device 300 to be charged. When both ends of the probe 201 are connecting to the electrode of the circuit board in the device to be charged and the circuit board 205 of the charging device, as long as the said charging device is connecting to the power, the charging process to the device 300 to be charged will get started, and the recycling of the device 300 to be charged will be achieved, which is environmentally friendly.

Further, the said probe 201 has a compressible resilient structure, which can be compressed following the direction of its length. In a specific embodiment of the application, due to the impossibility of pre-obtaining the distance between the electrode of the circuit boards in both the charging device and the device to be charged, thus the probe 201 is designed as a compressible resilient structure, so when the distance between the said electrode in the two circuit boards is smaller than the original length of the probe 201, the said probe 201 will be in a compressed status, and achieve the electrical connection between the electrode of the two circuit boards.

Preferably, as shown in FIG. 1, on the bottom of the charging chamber is provided with two pop-up structures 202, used to pop-up and eject the device 300 to be charged when taking it out. When it is needed to take the said device 300 to be charged out, press the said device 300 to be charged downwards to the bottom of the charging chamber, the said pop-up structure 202 will pop-up and eject the said device 300 to be charged, which is greatly convenient for users to take out the said device 300 to be charged.

Figure 3:
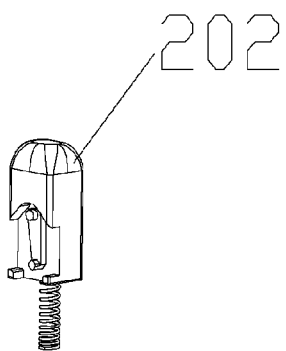
FIG. 3 illustrates a structural schematic diagram of the said pop-up structure as described in the present invention.
Figure 4:
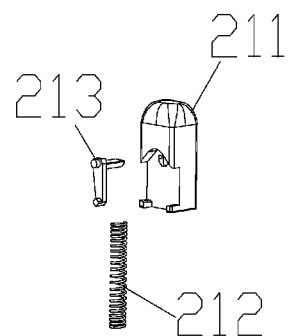
FIG. 4 illustrates an exploded diagram of the said pop-up structure as described in the present invention.

Specifically, as shown in FIG. 3 and FIG. 4, wherein, FIG. 3 illustrates a structural schematic diagram of the said pop-up structure 202 as described in the present invention, and FIG. 4 illustrates an exploded diagram of the said pop-up structure 202 as described in the present invention, the said pop-up structure 202 comprises a spring 212, and a pop-out cap 211, the pop-out cap 211 is arranged and connected to one end of the said spring 212, used to drive the said spring 212, while a position hook 213 is arranged and connected to the said pop-out cap 211, used to lock the position of the said pop-up structure onto the said charging device body. In the specific embodiment of the application, a groove used to engage the said position hook is arranged in the shell of the said charging device body 100 accordingly, and when placing the said device 300 to be charged into the said charging chamber 200, the said snap structure 203 will engage with the slot in the device 300 to be charged, and fix the said device 300 to be charged tightly in the said charging chamber 200, while the position hook 213 is engaging with the groove arranged in the shell of the said charging device body 100, and the said spring 212 is in a compressed status; when it is needed to take out the said device 300 to be charged, push the said device 300 to be charged downwards to the bottom of the charging chamber 200, the said snap structure 203 will be separated from the slot in the said device 300, and the said position hook 213 will also separate from the groove in the shell of the said charging device body 100, then the said spring 212 will pop out the said pop-out cap 211 to restore its original length, and the said pop-out cap 211 will pop out the said device 300 to be charged. Because of the arrangement of pop-up structure 202 in the charging device, it is convenient for users to take out the device to be charged when no more charging is needed.

Figure 5:
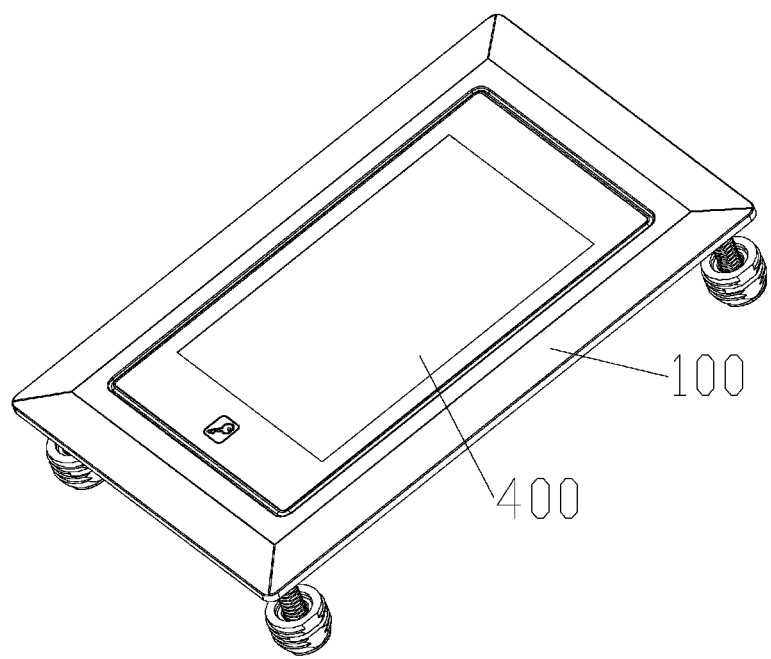
FIG. 5 illustrates a structural schematic diagram of a preferred embodiment on the said charging system for wireless hand controller as described in the present invention.
Figure 6:
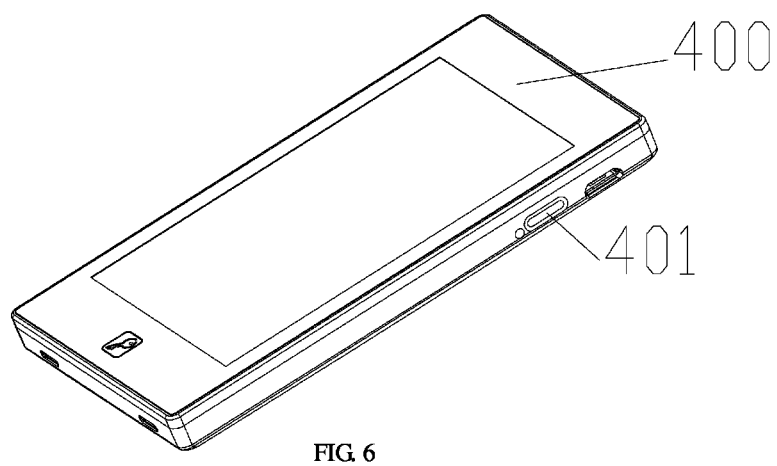
FIG. 6 illustrates a structural schematic diagram of the wireless hand controller in a preferred embodiment of the said charging system for wireless hand controller as described in the present invention.
Figure 7:
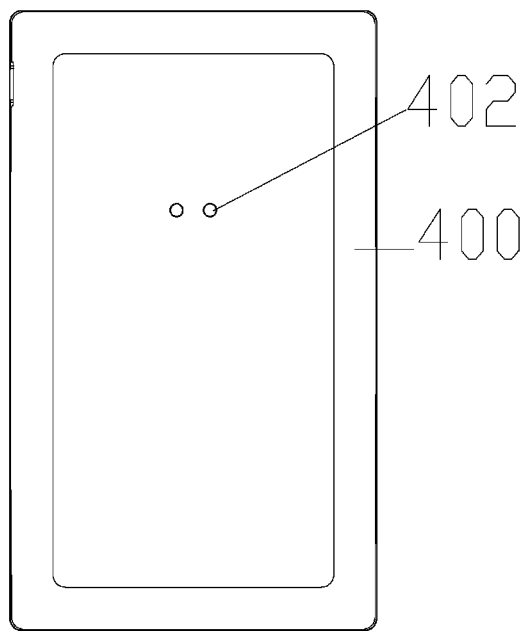
FIG. 7 illustrates a rear diagram of the wireless hand controller in a preferred embodiment of the said charging system for wireless hand controller as described in the present invention.

Based on the said charging device for wireless hand controller, the present invention also provides a charging system for wireless hand controller. Refer to FIGS. 5, 6 and 7, wherein, FIG. 5 illustrates a structural schematic diagram of a preferred embodiment on the said charging system for wireless hand controller as described in the present invention, FIG. 6 illustrates a structural schematic diagram of the wireless hand controller in a preferred embodiment on the said charging system for wireless hand controller as described in the present invention and FIG. 7 illustrates a rear diagram of the wireless hand controller in a preferred embodiment on the said charging system for wireless hand controller as described in the present invention. The said charging system for wireless hand controller comprises the said charging device for wireless hand controller, and, It also comprises a wireless hand controller 400 (which is an embodiment of the device 300 to be charged as shown in FIG. 2), on each of two side walls of the said wireless hand controller 400 is provided with a slot structure 401, used to accommodate the said snap structure 203, corresponding to the position of the said snap structure 203 in the charging chamber 200, and the said wireless hand controller 400 is provided with a charging hole 402, corresponding to the position of the probe 201 in the said charging chamber 200, used to accommodate the said probe 201.

In a preferred embodiment of the present invention, it is possible to charge the said wireless hand controller 400, when it is placed in the said charging chamber 200. And when the charging of the wireless hand controller 400 finishes, just press the said wireless hand controller 400 downward to the bottom of the charging chamber 200, the said pop-up structure 202 will pop up and eject the said wireless hand controller 400, which makes the removal of the hand controller 400 much more convenient.

In summary, a charging device for wireless hand controller and the charging system thereof, as provided by the present invention, which comprises a charging device body, wherein, on the said charging device body is provided with a charging chamber used to locate a device to be charged, on the bottom of the said charging chamber is provided with at least two probes and at least one pop-up structure, the said probe is used to connect to an electrode of the device to be charged, the said pop-up structure is used to pop-up and eject the device to be charged when taking it out, and on each of two opposing side walls of the charging chamber is provided with at least one snap structure used to lock and fix the device to be charged. Due to the pop-up structure arranged in the charging chamber of the charging device, used to pop-up and eject the device to be charged, when the charging is done and taking it out, also, due to the snap structure arranged on each of two opposing side walls of the charging chamber, which is used to fix the device to be charged, the placement or removal of the hand controller in the charging device becomes easier and more convenient.

It should be understood that, the application of the present invention is not limited to the above examples listed. It will be possible for a person skilled in the art to make modifications or replacements according to the above descriptions, which shall all fall within the protection scope of the appended claims of the present invention.

What is claimed is:

1. A charging device for wireless hand controller, comprising a charging device body, wherein the charging device body is provided with a charging chamber thereon to locate a device to be charged; the bottom of the charging chamber is provided with at least two probes and at least one pop-up structure thereon, wherein the probes are used to connect to an electrode of the device to be charged, and the pop-up structure is used to pop-up and eject the device to be charged; and each of two opposing side walls of the charging chamber is provided with at least one snap structure thereon to lock and fix the device to be charged.

2. The charging device for wireless hand controller according to claim 1, wherein the charging device body is provided with at least four fixing structures thereon to fix a multi-layer shell of the charging device body.

3. The charging device for wireless hand controller according to claim 2, wherein each of the fixing structures comprises an external thread structure and a nut structure, wherein the external thread structure is arranged on the multi-layer shell of the charging device body, and the nut structure is screwed on the external thread structure.

4. The charging device for wireless hand controller according to claim 1, wherein the bottom of the charging chamber is provided with two probes thereon to connect to the electrodes of the device to be charged.

5. The charging device for wireless hand controller according to claim 4, wherein each of the probes has a compressible resilient structure, which can be compressed along the length direction of the probe.

6. The charging device for wireless hand controller according to claim 1, wherein the bottom of the charging chamber is provided with two pop-up structures thereon to pop-up and eject the device to be charged.

7. The charging device for wireless hand controller according to claim 6, wherein each of the pop-up structures comprises a spring and a pop-out cap, wherein the pop-out cap is connected to one end of the spring to drive the spring, and a position hook is arranged and connected to the pop-out cap to lock the pop-up structure onto the charging device body.

8. A charging system for wireless hand controller, comprising a charging device body and a wireless hand controller, wherein the charging device body is provided with a charging chamber thereon to locate a device to be charged; the bottom of the charging chamber is provided with at least two probes and at least one pop-up structure thereon, wherein the probes are used to connect to an electrode of the device to be charged, and the pop-up structure is used to pop-up and eject the device to be charged; and each of two opposing side walls of the charging chamber is provided with at least one snap structure thereon to lock and fix the device to be charged; wherein each of two side walls of the wireless hand controller is provided with a slot thereon to accommodate the snap structure, corresponding to the position of the snap structure in the charging chamber, and the wireless hand controller is provided with a charging hole used to accommodate the probe, corresponding to the position of the probe in the charging chamber.

9. The charging system for wireless hand controller according to claim 8, wherein the charging device body is provided with at least four fixing structures thereon to fix a multi-layer shell of the charging device body.

10. The charging system for wireless hand controller according to claim 9, wherein each of the fixing structures comprises an external thread structure and a nut structure, wherein the external thread structure is arranged on the multi-layer shell of the charging device body, and the nut structure is screwed on the external thread structure.

11. The charging system for wireless hand controller according to claim 8, wherein the bottom of the charging chamber is provided with two probes thereon to connect to the electrodes of the device to be charged.

12. The charging system for wireless hand controller according to claim 11, wherein each of the probes has a compressible resilient structure, which can be compressed along the length direction of the probe.

13. The charging system for wireless hand controller according to claim 8, wherein the bottom of the charging chamber is provided with two pop-up structures thereon to pop-up and eject the device to be charged.

14. The charging system for wireless hand controller according to claim 13, wherein each of the pop-up structures comprises a spring and a pop-out cap, wherein the pop-out cap is connected to one end of the spring to drive the spring, and a position hook is arranged and connected to the pop-out cap to lock the position of the pop-up structure onto the charging device body.

* * * * *